United States Patent [19]

Hilbelink et al.

[11] 3,725,501

[45] Apr. 3, 1973

[54] INTERCROSSING RESIN/CURING AGENT ADHESIVE SYSTEMS

[75] Inventors: Ronald D. Hilbelink, Dayton; Gavin H. Peters, Lebanon, both of Ohio

[73] Assignee: The National Cash Register Company, Dayton, Ohio

[22] Filed: Jan. 28, 1972

[21] Appl. No.: 221,836

Related U.S. Application Data

[62] Division of Ser. No. 60,962, July 2, 1970, Pat. No. 3,657,379, which is a division of Ser. No. 840,060, July 8, 1969, abandoned.

[52] U.S. Cl. ............ 260/824 R, 117/100 C, 156/327, 156/329, 156/330, 156/331, 156/332, 161/DIG. 1, 161/DIG. 5, 252/316, 260/6, 260/7.5, 260/9 R, 260/18 EP, 260/18 S, 260/24, 260/26, 260/37 EP, 260/40 R, 260/823, 260/824 EP, 260/827, 260/830, 260/835, 260/836, 260/858, 260/859, 260/860, 260/862, 260/889, 264/4
[51] Int. Cl. .... C08g 47/10, C08g 45/06, C08g 39/10
[58] Field of Search ..... 260/824, 824 EP; 117/100 C; 161/DIG. 1; 264/4; 252/316

[56] References Cited

UNITED STATES PATENTS

| | | | |
|---|---|---|---|
| 3,316,324 | 4/1967 | Mendoyanis | 260/830 |
| 3,167,602 | 1/1965 | Bentov et al. | 264/4 |
| 3,270,100 | 8/1966 | Jolkovski et al. | 264/4 |
| 3,395,105 | 7/1968 | Washburn et al. | 260/9 |
| 3,396,117 | 8/1968 | Schuetze | 252/316 |
| 3,505,428 | 4/1970 | Kidwell et al. | 260/823 |

*Primary Examiner*—Samuel H. Blech
*Attorney*—Robert J. Shafer

[57] ABSTRACT

Novel adhesive systems are disclosed which pertain to combinations of more than one curable resin and the curing agents corresponding thereto. The disclosed adhesive systems comprise separated reactive components wherein: (a) a first reactive polymeric material is combined with a curing agent for a second reactive polymeric material to yield one component and; (b) the second reactive polymeric material is combined with a curing agent for the first reactive polymeric material to form another component. Several embodiments relating to intercrossing combinations of the two components are disclosed. In all of the embodiments, when the reactive materials from two components are combined, the curing agents react with their respective, intercrossed, reactive polymeric material to yield strong adhesive bonds. Of particular interest in this invention are embodiments of the adhesive systems which pertain to a rapidly curing adhesive and especially to such an adhesive for use underwater.

2 Claims, No Drawings

INTERCROSSING RESIN/CURING AGENT ADHESIVE SYSTEMS

This is a division of application Ser. No. 60,962, filed July 2, 1970, now U.S. Pat. No. 3,657,379, issued April 18, 1972, which is a division of application Ser. No. 840,060, filed July 8, 1969, now abandoned.

BACKGROUND OF THE INVENTION

1. Field of the Invention

The present invention pertains to curing adhesive systems having intercrossed combinations of curable resins and curing agents therefor. It more particularly pertains to such curing adhesive systems wherein there are at least two components;—one component containing a first curable resin and a curing agent for a second curable resin and another component containing the second curable resin and a curing agent for the first curable resin. Thus, "intercrossing" refers to combination of curable resins and corresponding curing agents wherein; when separated adhesive system components are mixed together, the resins each come into contact with their respective curing agents to effect independent curing reactions and to afford a combination of the desirable adhesive characteristics of all of the curing resins. More specifically, the present invention relates to such intercrossing adhesive systems wherein at least one of the components exhibit particularly rapid cures or short curing time.

One requirement for such intercrossing adhesive systems is that the first curable resin be unreactive with the curing agent for the second curable resin and, in turn, that the second curable resin be unreactive with the curing agent for the first curable resin; thus permitting combination of one curable resin with the curing agent corresponding to another resin from the intercross. In some embodiments of the present invention, components which include one curable resin and the intercrossed, corresponding, curing agent can be contained in individual, minute, capsules and the capsules can then be mixed with a second curable resin and curing agent combination. Both components can be encapsulated to yield a completely dry, rapid curing, adhesive system.

Some embodiments of the present invention specifically pertain to adhesive systems of intercrossed components which are particularly applicable to use underwater, that is, to adhesive systems which exhibit rapid cure rate and which operate to promote adhesive bonding on wet surfaces.

2. Description of the Prior Art

U.S. Pat. No. 3,224,020 issued Dec. 21, 1965, on the application of Peter Bosworth discloses a process for laminating by using curable polymeric materials. In that process, each of two individual plys of the intended laminate carry a different curable resin;—the resins being selected to react together and cure at elevated temperatures to yield a strong lamination. The curing materials of that process include two mutually reactive resins. The resins are reactive together to form a single, cured, thermosetted material which material exhibits the adhesive and polymeric characteristics of only a single cured polymeric compound.

U.S. Pat. No. 3,111,569 issued Nov. 19, 1963, to David Rubenstein discloses curing adhesive systems and laminating constructions which utilize curing adhesive systems. The patent further discloses many varied combinations of resins and curing agents therefor. The patent does not disclose features of the present invention with respect to intercrossing of at least two reactive resins with at least two corresponding curing agents included in individual components of an adhesive system.

U.S. Pat. No. 3,395,105 issued July 30, 1968, on the application of Robert M. Washburn et al. discloses a single curable resin adhesive system using a single curing agent material. The adhesive system of that patent is a "wet", single package, adhesive system wherein epoxy resin curing agent is encapsulated and the capsules of curing agent are dispersed in a carrier of liquid epoxy resin adhesive material. Neither the adhesive system composition nor the combination of materials disclosed in the above-named patent includes the intercrossing of a plurality of resins with corresponding resin curing agents.

SUMMARY OF THE INVENTION

Many systems of curable resins are known and each of those systems exhibit characteristics which serve to recommend a particular system for a particular adhesive job. Many times, it is desired or required to obtain the combined characteristics of two or more of the curable adhesive resins so that the advantages of more than one of the curable adhesive systems might be realized in a single application. Moreover, there has been a long-felt need for an effective and efficient single-package, curable resin, adhesive system. Such a single package system would have the advantage of convenience in not requiring that the separate curable resin and curing agent components, individually packaged, be combined at the site at the time of usage. Many solutions to the problem of development of a single package adhesive system using curable resins have been proposed;—some of them apparently very effective in some aspects of their operation. However, a single-package adhesive system, or even a two-package adhesive system, wherein more than one curable resin is accompanied by, or combined with, more than one corresponding curing agent material had not, to applicants' knowledge, been developed before this invention. As pointed out above, it is often desired to obtain the combined characteristics of individually cured resin adhesive materials because those individual characteristics may well supply a synergistic combination of desirable resulting effects.

Individual curing adhesive systems each have their own characteristic properties with respect to such aspects as cure time, adhesive propensities, toughness of the cured product, stability of the uncured components under various conditions, and stability and resistance of the cured product to chemical change. For many adhesive bonding uses, some combination of the above-named properties may be more advantageous than the properties provided by a system utilizing a single curable resin. For example, one curable adhesive system having a rapid cure time but mediocre adhesion characteristics may be combined with a second curable resin system having a longer cure time but much improved adhesion characteristics, thereby, providing a total adhesive system which exhibits some adhesion, after only a short period of time, and after a longer period of time, much improved and very strong adhesion.

Although the novel adhesive systems of this invention are broadly applicable to any area where particular adhesive bonding characteristics are desired; and although adhesive systems of the present invention can be formulated with respect to particular parameters regarding pre-cure, cure and post-cure characteristics, the curable, intercrossed, adhesive systems of the present invention find most important, specific, application in certain specialty uses. Such specialty uses include, for example, adhesives for use underwater, adhesives for use in a vacuum, adhesives for use at low temperature or at high temperature, and adhesives for use on special materials or on materials having especially rough surfaces or wet surfaces, or any of several combinations of those specific qualifications.

It has now been discovered that multi-component "wet" and "dry", one-, two- or multi-package systems can be manufactured, utilizing the concept of intercrossed curable resins and corresponding curing agent reactive materials. Each of the components of the novel adhesive system contains at least one curable resin and each also contains a curing agent for a curable resin. So-called "dry" adhesive systems of the present invention have each component protected from contact with another and from the ambient environment by being encapsulated, usually in individual, minute, substantially spherical, capsules having pressure-rupturable capsule walls. So-called "wet" systems of the present invention, in the case of two-package or multi-package systems do not require encapsulation of adhesive components or ingredients.

Wet systems of the one-package variety have one of the adhesive components protected from contact with the other component and from the ambient environment by being encapsulated. One-package adhesive systems, as the name implies, are adhesive systems wherein the two components are combined in a single package without premature activation and consequent curing of the adhesive materials. For example, a one-package wet system includes one encapsulated component of curable resin and intercrossed curing agent wherein the capsules containing that component are dispersed in or mixed with a second component which is an unencapsulated curable liquid resin carrier. The uncured adhesive system, then, is a pasty or possibly liquid, sticky, mass which contains two reactive resins and which is potentially curable on rupture of the capsules dispersed within the unencapsulated resin carrier.

Adhesive systems of the one-package dry variety have all liquid components protected and solidified by being encapsulated. The solid and encapsulated components of the adhesive system are combined in a single package and form a dry, usually powdery-looking and free-flowing, material which is potentially curable on rupture of the walls of the capsules containing the components.

Two-package adhesive systems can also be provided in wet and dry attitudes;—the appellation "two-package" simply referring to the fact that the two components of the reactive adhesive systems are not in intermingled contiguity, that is, they are separated such as by being contained and stored in individual containers.

An important feature of the present invention resides in the intercrossing, between at least two adhesive components, of curable resins and corresponding curing agent materials therefor. Such intercrossing permits the use of two entirely different curable resins having entirely different and synergistic characteristics. Intercrossing can provide for an adhesive system comprising first and second curable resins and corresponding first and second curing agents for those resins wherein the first curable resin, unreactive with the second curing agent, is combined therewith to yield a first component; and the second curable resin, unreactive with the first curing agent, is combined therewith to yield a second component. The components, when mixed together, result in contact of the curable resins with their corresponding curing agents to yield a curing adhesive reaction and consequent adhesive bond between juxtaposed workpieces.

It is an object of the present invention to provide intercrossing curable adhesive systems. It is a further object to provide such systems having at least two components and to provide them in both "wet" and "dry" adhesive system formulations. Specifically, it is an object of the present invention, in a dry formulation, to provide liquid components of the intercrossing adhesive systems in an encapsulated form wherein the capsules have pressure-rupturable capsule walls and wherein the capsules are minute in size.

It is an object of the present invention to provide one- or two- or multi-package intercrossing adhesive systems having curable resin materials as ingredients in the system. It is a further object to provide such systems having at least two different kinds of curable resins wherein the adhesive, once activated, polymerizes to a chemically cured product having a combination of characteristics provided by the individually cured resins.

It is an object of the present invention to provide such intercrossing adhesive systems wherein the adhesive systems are especially useful under special conditions or in a special bonding application as, for example, fast curing reactions underwater at low temperatures or in corrosive environments or in a vacuum.

At least four types of intercrossing adhesive systems have been identified and they represent separate embodiments of the present invention. The four separate embodiments have generally been set out hereinabove and, using the definitions thus-far developed, the four embodiments include the following: (a) single-package, dry adhesive system wherein both components are encapsulated and the capsules are mixed together to form a dry powder; (b) a single-package, wet adhesive system wherein one of the components is encapsulated and the capsules are mixed with a liquid second component; (c) two-package, dry adhesive system wherein the individual components are encapsulated but the capsules of the two components are stored separately; and (d) two-package, wet adhesive system wherein neither component is encapsulated and each component is stored individually. It should be noted that in all except (d) of the above-identified separate embodiments of the present invention at least one of the components can be encapsulated. System (d) is an example of a system including at least two curable adhesive resins and the corresponding curing agents wherein the feature of intercrossing components is emphasized as providing an aspect of novelty to the embodiment.

Capsules for containing components of the adhesive system of this invention can be made by many of several well-known encapsulating processes. Examples of appropriate or eligible encapsulation processes include chemical encapsulating processes and mechanical encapsulating processes. A mechanical encapsulating process is characterized, generally, by including: impingement of droplets of the material to be encapsulated upon liquid or semi-solid films of intended capsule wall material; separation of the thereby-encapsulated droplet from the film of impingement; and solidification of the capsule wall material. Chemical encapsulating processes generally include: (a) interfacial polymerization between reactive materials- one each included in a continuous phase capsule manufacturing vehicle and in droplets of the material to be encapsulated—wherein droplets to be encapsulated are dispersed in a liquid capsule manufacturing vehicle; and (b) liquid-liquid phase separation of polymeric capsule wall material from solution in a liquid capsule manufacturing vehicle wherein the phase-separated polymeric material wets and enwraps dispersed particles of intended capsule core material. The encapsulating process most usually utilized in practice of the present invention has been the last named encapsulating process of liquid-liquid phase separation. In order to provide a more complete understanding of the invention one such encapsulating process will be described in the section below titled "Description of Preferred Embodiments". Examples of methods eligible for use in encapsulating substantially water insoluble adhesive ingredients include those processes described in U.S. Pat. No. 3,190,837 issued June 22, 1965, on the application of Carl Brynko et al., and also by the process disclosed in U.S. Pat. No. 3,341,466 issued Sept. 12, 1967, on the application of Carl Brynko et al. Examples of encapsulating processes eligible for use in encapsulating appreciably water soluble ingredients of the adhesive systems of the present invention include those processes disclosed in U.S. Pat. No. 3,155,590 issued Nov. 3, 1964, on the application of Robert E. Miller et al., and U.S. Pat. No. 3,415,758 issued Dec. 10, 1968, on the application of Thomas C. Powell et al.

Capsules for use in the present invention can be any convenient size and can range, for example, from less than 100 microns to several thousand microns or perhaps slightly larger. Capsules in that size-range are generally considered to be minute in size. Limitations on capsule sizes are limitations imposed by capsule manufacturing methods or are limitations provided by consideration of the following points: (a) smaller capsules generally require more force for rupture per unit of material delivered by the ruptured capsule; (b) smaller capsules are more difficult to rupture when the rupturing workpiece surface or substrate in which the capsules are coated is rough, because the smaller capsules are effectively hidden by irregularities in the capsule-rupturing workpiece; (c) smaller capsules are disadvantageous for some systems because the small capsules carry less of payload as determined in percent, by weight, and therefore leave relatively more capsule "chaff" than do large capsules; (d) small capsules, when ruptured, provide a more homogeneous mixture of the adhesive components than do larger capsules and, in cases where intimate mixture of the reacting ingredients of an adhesive system is important, the disadvantages of using small capsules in adhesive systems of the present invention may be overshadowed by the advantage presented in homogeneity of adhesive system components. Preferred capsule sizes for use in the present invention vary from about 250 microns to about 2,500 microns in average diameter;—500 microns to about 1,500 microns being most preferred. Capsules used to contain the adhesive compositions of the present invention can have contents of from about 50 to nearly 100 percent, by weight. Capsules usually used in practice of the present invention contain from about 75 to about 95 percent, by weight, active adhesive system ingredients;—with the preferred range being from about 80 to about 90 percent, by weight.

Capsule wall materials in capsules eligible for use in the present adhesive system composition include, generally, any appropriate polymeric film-forming material. As a few examples, not meant to be limiting, capsule walls can be made from any of the following: natural hydrophilic polymeric materials such as, gelatin, gum arabic, starch, carrageenan and zoin; natural polymeric materials modified in some way or processed such as, ethyl cellulose, carboxymethylcellulose, shellac, rosin and nitrocellulose; and other polymeric materials which might include polyvinyl alcohol, polyethylene, polystyrene, polyacrylamide, polyether, polyester, polybutadiene, silicone, epoxy and polyurethanes. It should be noted that the above listings represent only a few of the eligible polymeric materials for use as capsule wall materials; and it should be further noted that some of the above listed polymeric materials are also materials eligible for use, in unreacted form, as adhesive ingredients in the present adhesive systems. Ingredients for use in the adhesive systems, are present in the form of liquid, curable, polymeric materials while those same materials, when used as capsule walls, are no longer highly reactive and are in a solid form.

Curable polymeric resin materials eligible for use in the adhesive systems of the present invention include, among others; epoxide resins, unsaturated polyesters, silicone resins, polysulfides, and polyurethanes. Some of the eligible curable polymeric materials are briefly described hereinbelow.

Epoxide resins are also known as polyepoxide resins or epoxy resins and are characterized by having epoxy chemical groups,

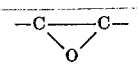

wherein an oxygen atom is joined to each of 2 carbon atoms which are already united in some other way. Epoxy resins which contain the epoxy groups can be saturated or unsaturated, aliphatic, cycloaliphatic, aromatic or heterocyclic and can be substituted, if desired, with other substituents such as chlorine atoms, hydroxyl groups, ether radicals, and the like. They can also be monomeric or polymeric. Other examples of epoxy resins include epoxidized esters of unsaturated monocarboxylic acids, epoxidized esters of unsaturated monohydric alcohols and polycarboxylic acids, epoxidized esters of unsaturated alcohols and of unsaturated carboxylic acids, epoxidized polymers and coploymers of diolefins, and the like. Epoxy resins preferred for use in the present invention include glycidyl esters and glycidyl ethers. Specific epoxy resins especially preferred in the present invention include diglycidyl ethers of bisphenol A both alone and diluted with other glycidyl ethers such as butyl glycidyl ether or phenol glycidyl ethers; epoxidized oils such as epoxidized soybean oil and the diglycidyl ester of linoleic acid, the triglycidyl ethers of glycerol and trimethylolpropane; triglycidyl p-aminophenol and, specifically, materials such as 3,4-epoxy-6-methylcyclohexylmethyl-3,4-epoxy-6-methylcyclohexane carboxylate and 3,4-epoxycyclohexylmethyl-3,4-epoxycyclohexane carboxylate and bis(3,4-epoxy-6-methylcyclohexylmethyl) adipate.

Curing agent materials for use with the epoxy resins in the present adhesive systems include: amines and aminophenols including aliphatic polyamines such as ethylenediamine, and triethylenetetramino and materials such as tris(dimethylaminomethyl)phenol; boron trifluoride complexes such as a complex of boron trifluoride with tetrahydrofuran or with polypropylene glycol; other boron containing materials such as trimethoxyboroxine and tricresyl borate (tri-m,p-cresyl borate); (BF$_3$-piperazine)mercaptans; organic acids and acid anhydrides; and inorganic salts such as magnesium perchlorate, cupric arsenate, aluminum chloride, stannic chloride and other Friedel-Crafts-type reactants and the like.

"Polyester resins" as used in this invention means unsaturated polyester resins which can be further polymerized. The unsaturated polyester resins usually contain, as a diluent, an unsaturated monomer, such as styrene. The unsaturated polyester resins are usually the product of a reaction between unsaturated dibasic acids, such as maleic acid, and a dihydric alcohol. Unsaturated polyester resins cure or continue their polymerization reaction by a free-radical mechanism. Such free-radical polymerization is self-sustaining after initiation and the polymerization requires a minimum amount of mixing of the curing agent with the polyester resin. Curing unsaturated polyester systems utilize a resin, an initiator, and an accelerator. For purposes of this invention, the curable resin portion of a polyester component includes the unsaturated polyester resin and the so-called accelerator (helpful in the cure of that resin). Accelerators for unsaturated polyester resins include materials such as diethylaniline, dimethylaniline, and N,N-dimethyl toluidine. Accelerators can be combined with the unsaturated polyester resin material without undue danger of preliminary or undesired polymerization reaction in the absence of initiator material. So-called initiators for the polyester resins will be henceforth identified as curing agents. Curing agents for the unsaturated polyester resins include such materials as benzoyl peroxide, ethylmethylketone peroxide, cumene hydroperoxide, and dichlorobenzoyl peroxide. Of course, other curing agents for the unsaturated polyester resin are eligible for use in the present invention and are well-known in the art. It should be pointed out that, while unsaturated polyester materials are well-known generally, individual and specific formulations of such unsaturated polyester materials which are commercially available, are very often difficult to particularly identify. Identification of specific polyester resins is difficult due to the kind, type, and concentration of polymerization-inhibiting materials added to a commercial polyester formulation by the manufacturer. Tetraethylene glycol dimethacrylate and like materials, in monomeric form, can also be used as an unsaturated polyester material in practice of the present invention.

Polysulphide resins eligible for use in the present invention are curable polymeric materials generally obtained by a reaction between sodium polysulphide and organic dichlorides of various kinds. Specifically, polysulphide rubbers can be the product of a chemical reaction between dichlorodiethylformal and an alkali polysulphide. Polysulphides can have a general chemical structure as follows: HS($C_2H_4$—O—$CH_2$—$C_4$—S—S)$_n$$C_2H^1$—O—CH$_2$—O—C H $_4$SH, where "$n$" is an integer from 1 to 25. Curing agents for curable polysulphide resins include manganese dioxide, lead dioxide, antimony trioxide, and tellurium dioxide, preferably having an orthorhombic crystal lattice structure.

Curable silicone resins eligible for use in the present invention are polymeric materials generally obtained from a polymerization of an alkyl-substituted silanol. Specifically, silicone rubbers can be the product of a polymerization of dimethylsilanediol. Silicone rubbers can have a general chemical structure as follows: HO—Si$(CH_3)_{2b}$—O[Si$(CH_3)_2$—O]$_n$Si$(CH_3)_2$—OH, where "n" is an integer. Curing agents for the curable silicone resins include tin octoate, lead octoate and dibutyl tin dilaurate. Curable silicone resin formulations can also be manufactured to yield a cure on contact with moisture.

Another curable polymeric resin eligible to be used in the present invention is polyurethane prepolymer material. Such polyurethane prepolymer resins include free isocyanate chemical groups as the reactive and polymerizing moiety of the molecule. Such polyurethane prepolymer materials are generally the reaction product of poly(alkylene) glycols and polyisocyanates. Specific polyurethane prepolymers might be, for example, a reaction product of poly(1,4-oxy-alkylene) glycol with tolylene diisocyanate and might have as much as 5 percent, by weight, free isocyanate groups available for reaction. Curing agents for use with the polyurethane prepolymer resins include methylene-bis-(o-chloroaniline), polyols, such as 1,4-butanediol, or trimethylolpropane, or even water.

The only criterion for selection of the curable polymeric material systems eligible for use in the present invention, resides in the requirement that the individual curable polymeric materials be unreactive with the corresponding intercrossing curing agent materials, that is, the curing agents cannot be reactive with the carrier resins.

DESCRIPTION OF PREFERRED EMBODIMENTS

Example I

The intercrossing adhesive system of this example is a single-package, dry, composition wherein one component includes curable polyepoxide resin and the other component includes unsaturated polyester resin. The component containing liquid polyepoxide resin also contains benzoyl peroxide as a curing agent for the unsaturated polyester; and the component containing unsaturated polyester contains a tertiary amine epoxide curing agent — N,N-dimethyl-meta(and/or para-)-toluidine (DMT). The polyepoxide material is identified as 3,4-epoxycyclohexylmethyl-3,4-epoxy-cyclohexane carboxylate (sold as "ERL 4221" by the Union Carbide Corporation, New York, N.Y., U.S.A.). The polyester resin is a styrenated unsaturated alkyd resin containing about 49 percent, by weight, styrene and having a viscosity of about 300 centipoises at 25° centigrade (sold under the tradename "Aropol 7240 MC" by the Ashland Chemical Company, U.S.A.).

In order to provide a more complete disclosure of the present invention for this Example I, a complete description of the process utilized in encapsulating the adhesive system components will be disclosed.

ENCAPSULATION OF THE UNSATURATED POLYESTER COMPONENT

An 11 percent, by weight, aqueous solution of pigskin gelatin having a Bloom strength of 285 to 305 grams and an iso-electric point of pH 8 to 9 was prepared, and the pH of the solution was adjusted to about 9.0 with 20 percent, by weight, aqueous sodium hydroxide solution. The temperature was adjusted to about 55° centigrade. To 800 milliliters of stirred distilled water maintained at 55° centigrade, were added: 150 milliliters of the warmed gelatin solution; 180 milliliters of 11 percent warm (55° centigrade) aqueous gum arabic solution; and 80 milliliters of a 2 percent, by weight, aqueous solution of a mixture of sodium hydroxide-neutralized copolymers of ethylene and maleic anhydride (a 1-to-1, by weight, ratio of "EMA-21" (trademark) and "EMA-31" (trademark), which are poly(ethylene-co-maleic anhydride) materials having molecular v eights of about 6,000 and 60,000 to 70,000, respectively, as sold by Monsanto Chemical Company, St, Louis, Mo., U.S.A. The pH of the resultant gelatin-gum arabic-copolymer mixture, adjusted to a temperature of about 30 degrees centigrade, was adjusted to about 6,5 to yield optimum emergence of a liquid, wall-forming, coacervate phase. The stirring was maintained and 220 grams of a mixture of 10 percent, by weight, DMT in the unsaturated polyester resin was added. The rate of stirring was adjusted to produce a dispersion of droplets of the polyester component about 1,000 to 1,500 microns in diameter. The stirring mixture was permitted to cool over a duration of about 16 to 20 hours during which time the once-liquid coacervate phase individually encased the polyester droplets and gelled. The mixture, now including capsules, was chilled to about 10° centigrade.

ENCAPSULATION OF THE POLYEPOXIDE COMPONENT

To 400 milliliters of distilled water were added 90 milliliters of an 11 percent, by weight, aqueous solution of the above-specified pigskin gelatin and 90 milliliters of an 11 percent, by weight, aqueous gum arabic solution. The pH of the mixture was adjusted to about 4.3 at a temperature of about 40° centigrade. Agitation of the system was commenced and about 120 grams of a 10 percent, by weight, mixture of benzoyl peroxide in the polyepoxide material was added. The rate of stirring was adjusted to produce droplets approximately 1,000 to 1,500 microns in average diameter. The stirring mixture was permitted to cool to room temperature to yield gelled capsule walls.

The capsules from each of the above-described encapsulating processes are then isolated from the aqueous manufacturing vehicle and the capsule walls are dried. Either of the above encapsulating systems can be treated to isolate the capsules as follows: The encapsulating system is chilled to less than 10° centigrade and to that still-agitating system is added 10 milliliters of 25 percent, by weight, aqueous glutaraldehyde solution. The system is permitted to stir for about 16 hours, with the temperature of the system gradually increasing to about 25° centigrade. As an optional treatment, 5 milliliters of a cationic surfactant (such as "adogen 446" (trademark) as sold by Archer-Daniels-Midland Company, Minneapolis, Minn., U.S.A.) can be added to the system with continued stirring, followed, after about 30 minutes, with the addition of 20 to 40 milliliters of a 5 percent, by weight, aqueous solution of an anionic surfactant (such as "Armac 11T" (trademark) as sold by Armour Industrial Chemical Company, Chicago, Ill., U.S.A.) with stirring for an additional hour. Agitation is then stopped and the capsules are permitted to settle. The supernatant liquid is poured off, and an amount of distilled water equal to the decanted liquid is added to the vessel with resumption of agitation. To this stirring mixture of capsules and distilled water is added about 100 grams of a very finely-divided inert mineral filler material, such as magnesium silicate ("Celkate T-21" (trademark) as sold by Johns-Manville Company, New York, N.Y., U.S.A., having an ultimate particle size of about 0.1 micron). When the mixing is complete, the solid material comprising capsules and the inert filler material are filtered on a vacuum filtration apparatus and the filter cake is crumbled into a 2-unit wire mesh sieve system which retains capsules of more than about 100 microns in diameter, but passes smaller capsules and free particles of the mineral filler. The sieve system is placed on a forced-air dryer, and air at a temperature of approximately 25° centigrade is circulated through the sieves with enough force to blow the small capsules and particles of excess dry mineral filler out through the top sieve. The blower is operated until the sieve contents are dry and free-flowing. The product of each of the above-described encapsulating processes was capsules, graded according to size, and containing one curable liquid resin along with curing agent material for the other curable liquid resin. Single package, dry, polyepoxide-unsaturated polyester adhesive systems were formulated using capsules from the two above-described encapsulating processes simply by mixing appropriate amounts of the capsules together. Mixtures of the capsules, when crushed between workpieces to be adhesively bonded, provided amounts of epoxy resin and epoxy resin curing agent and amounts of unsaturated polyester and polyester curing agent to be independently cured and to provide the individual advantages characteristic of each of the two adhesive materials. Acceptable cures were obtained by using weight ratios of from 2-to-1 to 1-to-2 (polyester-to-polyepoxide). It was determined that addition of a viscosity builder to the polyester resin component enabled improved mixing characteristics in the adhesive system. With that in mind, capsules utilizing the above-identified unsaturated polyester material and the above-identified polyepoxide material were again prepared with the exception that, this time, the polyester resin component included 5 percent, by weight, finely-divided titanium dioxide pigment as a filler material to increase the viscosity. A combination of two parts, by weight, of the titanium dioxide-containing polyester resin capsules with one part, by weight, of the polyepoxide capsules forms the preferred single package, dry, curable adhesive system for this Example I.

The capsule adhesive system of this example was tested in several ways and following are the results of those tests. An amount of the adhesive system was applied to steel test coupons by crushing capsules of the adhesive system between the coupons and then mixing the components for about five seconds. The coupons were held in aligned position during the adhesive curing reaction so that the overlap was approximately one square inch. The coupons were then separated on a tensile testing machine to determine adhesive bond strengths. The strength of the bonded steel-to-steel joints was tested using dry metal coupons and submerged metal coupons with the encapsulated adhesive system and with the same adhesive components but unencapsulated, as a control. The following table describes the results of one such test:

| Cure Time (Minutes) | Dry metal substrate. (Pounds per square inch (average) (Low - High) | Submerged metal substrate, Fresh water. (Pounds per square inch (average) (Low - High) |
|---|---|---|
| | Totally Encapsulated System | |
| 0.5 | 112 (90 - 145) | 90 (71 - 117) |
| 1.0 | 194 (165-220) | 146 (112-224) |
| 5.0 | 280 (203-354) | 318 (238-436) |
| | Unencapsulated System | |
| 0.5 | 87 (66 - 117) | 140 (112-165) |
| 1.0 | 194 (169-210) | 235 (199-275) |
| 5.0 | 506 (360-652) | 217 (147-316) |

It should be pointed out that in tests utilizing the unencapsulated adhesive system, portions of components of the unencapsulated adhesive system were placed on the faces of individual steel coupons and the adhesive components were combined and mixed by positioning the steel coupons face-to-face.

Another test to which the preferred, encapsulated, intercrossing adhesive system of this Example was subjected, included determination of tensile strength of the adhesive bonds on various kinds of substrates, under fresh water, at approximately 25° centigrade.

| Adhesive Substrate | Tensile Strength (pounds per square inch) | | |
|---|---|---|---|
| | 30 Second Cure Time | 1 Minute Cure Time | 5 Minutes Cure Time |
| Metal (Iron) | 98 | 197 | 369 |
| Fine textured finish | 33 | 65 | 258 |
| Coarse textured finish | | | 10 |
| Metal (Aluminum) | 32 | 69 | 214 |
| Wood (Pine) | | | 8 |
| Wood (Creosoted) | 3 | 9 | 30 |
| Concrete (Smooth) | 14 | 28 | 150 |
| Concrete (Rough) | 2 | 6 | 15 |

It should also be pointed out that other viscosity builders or filler material can be and have been added to the adhesive components of the systems of the present invention. Among those filler materials which have been added alone and in combination with each other, are included: aluminum oxide ($Al_2O_3$); powdered gelatin; powdered, cured, polyester resin; and six different, commercially available, silica thixotropic agents.

EXAMPLE II

In this example, single-package, wet, intercrossing adhesive systems are disclosed wherein one component of the adhesive system is encapsulated.

One such single-package, wet, adhesive system can include, as an unencapsulated portion of the system: 40 parts, by weight, of the unsaturated polyester resin material identified in Example I; two parts, by weight, of the DMT material identified in Example I; and 40 parts, by weight, of titanium dioxide filler, all combined to yield a paste with which are combined 20 parts, by weight, of encapsulated epoxy material of the kind identified in Example I, above, with the exception that the encapsulated epoxy material in this Example preferredly contains 20 percent, by weight, benzoyl peroxide.

Another single-package, wet, adhesive system can include one encapsulated component of epoxy-containing capsules as described and manufactured in the Examples above, and a paste comprising a halogenated unsaturated polyester resin having the following characteristics: viscosity, about 600 centipoises at 25 degrees centigrade; monomer content about 40 percent, by weight; halogen (chlorine) about 20 percent, by weight, and specific gravity about 1.23 at 25° centigrade (as sold under the trademark "Hetron 24806 resin" by the Hooker Chemical Corp., North Tonawanda, N.Y., U.S.A.). The polyester resin has dissolved therein two to three percent, by weight, of anhydrous stannic chloride. The stannic chloride serves as a curing agent for the polyepoxide resin. Surprisingly, at concentration of stannic chloride above about three percent, by weight, premature polymerization of the polyester resin may occur.

Other single-package, wet, adhesive system formulations which are considered to be included within the ambit of the present invention utilize two or more kinds of capsules and the capsules are dispersed in a liquid, curable resin, "paste". Following are two such formulations:

| Component Material | Weight Percent |
|---|---|
| Formulation A | |
| Unsaturated Polyester Resin ("Hetron 24806") with 10 percent, by weight, DMT | 40 |
| Encapsulated Unsaturated Polyester Resin ("Polylite 31-030")* | 30 |
| Encapsulated Polyepoxide resin with benzoyl peroxide ("ERL-4221") | 25 |
| Titanium Dioxide Filler | 5 |
| Formulation B | |
| Encapsulated Unsaturated Polyester Resin ("Polylite 31-039")* | 55 |
| Encapsulated Unsaturated Polyester Resin ("Hetron 24806") | 13 |
| Encapsulated DMT | 7 |
| Encapsulated Polyepoxide resin ("ERL-4221") with benzoyl peroxide | 20 |
| Titanium Dioxide Filler | 5 |

*"Polylite 31-039" is a trademark designation for an unsaturated polyester resin identified as having 25 to 50 percent, by weight, free styrene and other monomeric material, (as sold by the Reichhold Chemical Company, White Plains, N.Y., U.S.A.).

EXAMPLE III

This example discloses another embodiment of a single-package, dry, intercrossing adhesive system, wherein one of the components includes a liquid polysulphide resin as the curable adhesive resin and a second component comprises a liquid polyepoxide resin. A polysulphide resin having a molecular weight of about 1,000 and a viscosity, at 25° centigrade, of about 700 to 1,200 centipoises (such as that sold under the tradename of "LP-3" by Thiokol Chemical Corporation, Bristol, Pa., U.S.A.) is combined with a portion of either tetraethylenetetramine or hexamethylenetetramine and the combination is encapsulated to form the first component.

Included in the capsules of the second component is a liquid but viscous polyepoxide material of glycidyl ethers of bisphenol A having a viscosity of about 100-160 poises at 25° centigrade and an epoxide equivalent weight of 185 to 192 such as that sold by The Shell Chemical Company, New York, N.Y., U.S.A. under the tradename of "Epon 828". Epoxide equivalent weight is defined as the weight of epoxy resin, in grams, which contains 1 gram equivalent of epoxy. The polyepoxide material has dispersed therein, as a curing agent for the polysulphide resin, finely-divided particles of tellurium dioxide having an average size of about 20 microns and an orthorhombic crystal structure (such as the material having that description sold by Gallard-Schlesinger Chemical Manufacturing Company, Carle Place, N.Y., U.S.A.).

Another intercrossing adhesive system utilizing polysulphide and polyepoxide is as follows: One encapsulated component includes a liquid polysulphide resin having a molecular weight of about 4,000 and a viscosity, at 25° centigrade, of about 350 to 450 poises (such as that sold under the tradename "LP-2" by Thiokol Chemical Corporation) having combined therewith tricresyl borate, to serve as curing agent for the polyepoxide material in the other capsules. The other capsules include finely-divided particles of lead dioxide serving as curing agent for the polysulphide material;—the lead dioxide particles being dispersed in polyepoxide material such as that hereinabove described in Example I ("ERL-4221", trademark).

EXAMPLE IV

The intercrossing adhesive system of this Example includes polysulphide resin encapsulated as one component material, and unsaturated polyester resin encapsulated as the other adhesive component material. The encapsulated polysulphide material includes DMT as curing agent material for the, opposite, unsaturated polyester material; and the encapsulated unsaturated polyester material includes a dispersion of finely-divided load dioxide particles as curing agent for the, opposite, polysulphide resin.

EXAMPLE V

In this example, a polyurethane prepolymer material having benzoyl peroxide included in it, is encapsulated and those capsules are combined with capsules containing a liquid unsaturated polyester material having 4,4-methylene-bis-(2-chloroaniline) included in it, (sold under the tradename of "MOCA" by E. I. DuPont de Nemours and Company, Wilmington, Del., U.S.A.), as curing agent for the polyurethane prepolymer. Polyurethane prepolymer materials which can be used in this Example are toluenediisocyanate-terminated poly(alkylene glycol) materials (such as the material sold under the tradename "Adiprene L-100" having a molecular weight of about 2,000 (about 4.1 percent, by weight, free isocyanate groups), or the material sold under the tradename of "Adiprene L-167" having a molecular weight of about 1,300 (about 6.3 percent, by weight, free isocyanate groups), as sold by E. I. DuPont de Nemours Company, Wilmington, Del., U.S.A.).

Another intercrossing adhesive system which is eligible for use in the present invention includes a first component having an epoxy resin combined with lead octoate and a second component having a polyurethane prepolymer material combined with oxalic acid.

EXAMPLE VI

In this Example, polysilicone material (silicone rubber) serves as the curable resin in a first component of an intercrossing system and has combined therewith trimethoxyboroxine as a polyepoxide curing material. The second component includes a polyepoxide such as 3,4-epoxy-6-methylcyclohexylmethyl-3,4-epoxy-6-methylcyclohexane carboxylate (such as the material sold under the tradename "Unox 201" by the Union Carbide Corporation, New York, N.Y., U.S.A.). The epoxy resin has combined with it, a small amount of water;—the water serving as curing agent material for the polysilicone.

Polysilicone resins and polysulphide resins can also be used as two curable materials in an intercrossing system of the present invention. The silicone rubber has finely-divided manganese dioxide combined with it as a curing agent for polysulphide resin and the polysulphide resin material has lead octoate combined with it as a curing agent for the silicone rubber.

What is claimed is:

1. A multi-component, "dry" adhesive system comprising first and second curable resins and corresponding first and second curing agents therefor wherein the first curable resin is substantially unreactive with the second curing agent, is combined therewith and is contained in a multitude of individual, minute, pressure-rupturable capsules to yield a first component and the second curable resin is substantially unreactive with the first curing agent and is combined therewith and is contained in a multitude of individual, minute, pressure-rupturable capsules to yield a second component, each of said capsules is from about 250 microns to about 2,500 microns in average diameter and each individual capsule has about 75 to about 95 percent, by weight, component material, whereby the components, when mixed together and after rupture of capsules from first and second components, result in contact of the curable resins with corresponding curing agents to yield a curing, adhesive, reaction.

2. The adhesive system of claim 1 wherein the curable resins of the system are at least two selected from the group consisting of epoxide, unsaturated polyester, polysulphide, polyurethane prepolymer and polysilicone.

* * * * *